United States Patent Office 2,822,873
Patented Feb. 11, 1958

2,822,873

CEMENT COMPOSITION

Gerrit Jan Harmsen and Johan Gustaaf Stuve, Amsterdam, Netherlands, assignors to Shell Development Company, New York, N. Y., a corporation of Delaware No Drawing. Application November 8, 1955
Serial No. 545,804

Claims priority, application Netherlands
November 12, 1954

6 Claims. (Cl. 166—29)

The invention relates to a cement composition having a retarded setting action for cementing an oil-well borehole of a fairly great depth.

For cementing boreholes at great depths a cement slurry should be used which has a long setting time, since at great depths it takes longer for the cement slurry to arrive at its destination. Moreover, at these depths it is necessary to take into account the occurrence of higher temperatures (at 2,500 m.: approximately 90° C.; 4,000 to 5,000 m.: approximately 150° C.) which cause the slurry to set more rapidly. At a temperature of, for example, 150° C. setting commences twice to four times more rapidly than at a temperature of 90° C. Since the cement slurry must not begin to set before it has reached its proper place, care should be taken to ensure that the slurry does not set until the necessary time has elapsed.

When reference is made hereinbelow to the setting of a cement slurry, it is to be understood that this refers to the moment at which the so-called "initial setting" commences. The setting of the mixture of cement and water at first take place gradually. At a certain moment, however, it will accelerate rapidly. This moment is called "the moment of initial setting" and practically corresponds to the limit of pumpability. This moment can be conveniently determined with the Vicat apparatus.

It is known to prepare a cement slurry with retarded action by adding materials of various kinds to the cement used. Such an addition usually has one or more of the following disadvantages. The retarding effect of the material added is insufficient, or on the other hand it may be excessive; the retarding action is not easily adjustable or it greatly depends on the quantity added or is confined to certain types of cement; the materials added cause the slurry to foam, or they are not sufficiently stable; after hardening the cement is found to have no or too little strength.

Although some materials have been added to cements which have been found to be free of these disadvantages, e. g., certain synthetic resins, oxidized paraffin wax and shellac give excellent results, it has been found that their use in actual borehole cementing operations involved considerable difficulties. In practice, cement and a set-retarding additive are added in a hopper to a stream of the mixing water and the slurry thus obtained is immediately pumped into a well. In this manner of mixing, however, a sufficiently homogeneous mixing of the additive and the cement slurry is often not attained, and this is also the case when first the additive and then the cement are added to the mixing liquid in two successive hoppers. Thus, although the addition of a solid substance to the cement slurry does not constitute an insoluble problem, it does involve certain practical difficulties.

It is, therefore, a primary object of this invention to provide a cement composition which meets the requirements of cementing operations for wells 5000 meters or deeper.

Another object of this invention is to provide a cement composition which inherently possesses set-retarding characteristics at elevated temperatures such as those found in deep oil wells.

A further object of the present invention is to provide a hydraulic binding agent which forms an excellent deep-drilling cement by itself and which, together with one or more other substances, shows particularly good properties when cementing at very great depths. These and other objects of this invention will be understood from the following description of the invention.

According to the present invention, for cementing at fairly great depths finely-divided undercooled basic blast-furnace slags are used as hydraulic binding agents, which agents are free or substantially free of activators. Finely-divided materials which themselves have no binding properties, e. g., ground slate, bentonite, etc., may also be present if desired. If, however, finely ground quartz sand (quartz powder) and/or finely ground pozzuolanas (such as flue dust, trass, tuff, volcanic earth) are added, a deep-drilling cement is obtained which, if used for cementing at very great depths, not only has a long setting time, but also (owing to the high temperature occurring in situ) yields a hardened cement with a relatively high compressive strength.

By way of further elucidation it may be stated that up to this time finely ground blast-furnace slags have always been used together with activators in order to obtain a hydraulic binding agent or cement with sufficient hardening, since finely ground blast-furnace slag alone, mixed with water in the usual way, yields a slurry which does not set. In general, substances are used as activators which bring about a sufficiently high concentration of OH ions by some method or other. From the literature are known activators, inter alia, $Ca(OH)_2$, from which slag lime is formed; Portland cement, from which blast-furnace cement or iron Portland cement is formed, and also NaOH and soda. Gypsum also works in this direction: gypsum slag cement is a mixture of blast-furnace slags and gypsum.

The cement composition and process for making the same according to the present invention is based, on the one hand, on the new discovery that finely-divided undercooled basic blast-furnace slags can also set with water without activators, provided they are heated to a temperature of approximately 90° C., preferably to a temperature above 100° C.; and, on the other hand, on the twin concept that the earth itself can produce the high temperatures required for the setting, and that the (relatively long) setting times which occur, are exactly suitable for cementing boreholes at a depth at which the required high temperature occurs.

Most types of blast-furnace slags set at temperatures of above approximately 100° C.; various types set, however, already at approximately 90° C. or even somewhat lower.

In exceptional cases the cement slurry can be pre-heated to some extent before being pumped.

In view of the above, the depth at which cementing is carried out should be so great that the required temperature of approximately 90° C. occurs in situ. In practice this is usually a depth greater than approximately 2,500 meters, but the exact depth varies greatly from one oil field to another.

Although the hydraulic binding agent according to the invention can be used already at a depth of from 2,500 to 3,000 meters, the great importance of this binding agent lies in its possibility for use at the very great depths of from 4,000 to 5,000 meters, for which depths no wholly satisfactory deep-drilling cements have hitherto been commercially available.

The finely-divided blast-furnace slags should either be free from the activators mentioned above or should only contain such a quantity of them that the setting time is not reduced beyond the admissible minimum. A minimum setting time of 100 minutes at a temperature of 150° C. may serve as a guide.

The setting time may also be influenced by the choice of the fineness of grinding of the slags and by varying the ratio of mixing liquid to ground blast-furnace slags, the temperature being considered as a given magnitude. The addition of substances such as ground slate, trass, quartz powder, etc., or mixtures of these materials, usually causes some delay in setting.

As a rule, a higher compressive strength of the hardened cement and a shorter setting time of the slurry is obtained by finer grinding of the slags. The blast-furnace slags should, of course, always be ground to a fineness which is also met with in known types of cement, e. g., Portland cement. By grinding much finer, however, a great compressive strength of the hardened cement can be obtained without it being necessary for the setting time to become inadmissibly short.

It is often advisable to grind the blast-furnace slags so fine that at least 40% and preferably 50% or more is smaller than 20/μ.

A higher ratio by weight of water to slags in the slurry usually causes a smaller compressive strength and a longer setting time; a ratio by weight of water often used is approximately 0.4.

If it is required to cement boreholes at very great depths, especially good results are obtained by using quartz powder and/or finely divided pozzuolanas together with finely divided blast-furnace slags. It has been found that a slurry containing, besides finely-ground blast-furnace slags, also a quantity of quartz powder and/or finely-ground pozzuolanas finally yields a hardened cement with increased compressive strength after setting at a temperature higher than approximately 120–130° C. If the temperature on setting is lower, e. g., 90° C., this effect does not occur. For cementing at great depths the hardened cement should have a compressive strength of approximately 50 kg. per sq. cm., measured after 10 days.

Quartz powder and/or finely divided pozzuolanas are preferably used in a quantity of 20–70%, calculated on the quantity of blast-furnace slags.

In preparing the mixture the blast-furnace slags on the one hand the quartz sand and/or the pozzuolanas on the other hand may each be separately finely ground and then mixed, or they may be first mixed and then finely ground. The quartz powder should be sufficiently finely ground; preferably a quantity of 3–12% by weight of the total mixture should consist of quartz powder with a grain size <20μ.

The invention will be further elucidated by means of the following examples.

EXAMPLE I

Different types of finely-ground granulated undercooled basic blast-furnace slags were mixed with water to a slurry. The slurry was heated to 150° C. The setting time was measured in minutes up to the moment of initial setting (at a temperature of 150° C.) and the compressive strength in kg./sq. cm. after three days (also at a temperature of 150° C.). The measurements were made with the use of slags which were ground to different finenesses and the ratio by weight of water to slags was varied. The results are shown in Table I.

*Table I*

| Type of blast-furnace slag | Fineness of grinding fraction in percent, smaller than 20μ | Ratio by weight, water/slags | Setting time in min. at 150° C. | Compressive strength in kg./sq. cm. after 3 days at 150° C. |
|---|---|---|---|---|
| I | 38.0 | 0.32 | 75 | 95 |
|   | 38.0 | 0.40 | 125 | 50 |
|   | 38.0 | 0.50 | 155 | 45 |
| II | 36.0 | 0.32 | 160 | 60 |
|    | 36.0 | 0.40 | 200 | 45 |
|    | 36.0 | 0.50 | 200 | 25 |
| III | a—38.0 | 0.40 | 150 | 190 |
|     | b—58.5 | 0.40 | 100 | 220 |
| IV | a—43.4 | 0.40 | 190 | 25 |
|    | b—about 56.0 | 0.40 | 110 | 80 |
| V | a—26.0 | 0.40 | >450 | 45 |
|   | b—31.8 | 0.40 | >450 | 50 |

These results show that finely-ground undercooled basic blast-furnace slags form an excellent deep-drilling cement even for temperatures of 150° C., as setting times of 100 minutes or longer can be readily obtained and the required compressive strength (approximately 50 kg./sq. cm. after 10 days) is generally reached even after 3 days.

EXAMPLE II

The effect of quartz powder at various temperatures (90° C. and 150° C.) on the setting time and the compressive strength is shown by the results given in Table II. The ratio by weight of water to finely ground blast-furnace slags, or mixture of finely ground blast-furnace slags and quartz powder was 0.4.

*Table II*

| Type of blast-furnace slag | Parts by wt. of slag | Parts by wt. of quartz powder | Setting time in min. at— | | Compressive strength in kg./sq. cm. after— | | | |
|---|---|---|---|---|---|---|---|---|
| | | | 90° C. | 150° C. | 1 day at 90° C. | 3 days at 90° C. | 1 day at 150° C. | 3 days at 150° C. |
| VI | 100 | 0 | >480 | 150 | 0 | 170 | 120 | 95 |
|    | 80 | 20 | >480 | 405 | 0 | 95 | 55 | 135 |
|    | 70 | 30 | >480 | 330 | 0 | 75 | 80 | 240 |
|    | 60 | 40 | >480 | 260 | 0 | 0 | 95 | 315 |
| VII | 100 | 0 | >480 | 140 | 0 | 65 | 35 | 45 |
|     | 80 | 20 | >480 | 360 | 0 | 55 | 55 | 75 |
|     | 70 | 30 | >480 | 310 | 0 | 25 | 15 | 125 |
|     | 60 | 40 | >480 | 300 | 0 | 25 | 15 | 120 |

These results show that the addition of quartz powder on the one hand causes the setting time to be extended, and on the other hand that a considerable increase of the compressive strength is obtained when setting occurs at very high temperatures (150° C.). This increase does not occur at a temperature of 90° C.

EXAMPLE III

For the purpose of comparison, the same types of blast-furnace slags as used in Example I were mixed with quartz powder. Usually an extended setting time and an increased compressive strength was observed, as may be directly seen from a comparison of Table I with Table III.

Table III

| Composition of mixture | Ratio by wt. of water/mixture | Setting time in min. at 150° C. | Compressive strength in kg./sq. cm. after 3 days at 150° C. |
|---|---|---|---|
| I+quartz powder (in ratio by wt. of 70/30) | 0.32 / 0.40 / 0.50 | 135 / 240 / 375 | 290 / 190 / 170 |
| II+quartz powder (in ratio by wt. of 70/30) | 0.32 / 0.40 / 0.50 | 175 / 300 / 440 | 280 / 185 / 135 |
| IIIa+quartz powder | 0.40 | 300 | |
| IIIb+quartz powder (in ratio by wt. of 70/30) | 0.40 | 400 | 220 |
| IVb+quartz powder (in ratio by wt. of 80/20) | 0.40 | 225 | 240 |
| Va+quartz powder | 0.40 | >450 | 185 |
| Vb+quartz powder (both in ratios by wt. of 70/30) | 0.40 | 440 | 220 |

EXAMPLE IV

The setting time and compressive strength are also affected by the fineness of the quartz powder. This is shown by the results listed in Table IV. Too little fineness gives somewhat less good results. The ratio of water to mixture was 0.4.

The "original" quartz powder corresponds to the quartz powder used in Examples II and III.

Table IV

| Type of blast-furnace slag | Type of quartz powder | Mixing ratio of slags/quartz powder | Parts by wt. of quartz powder <20μ, calculated on mixture | Setting time in min. at 150° C. | Compressive strength in kg./sq. cm. after 3 days at 150° C. |
|---|---|---|---|---|---|
| I | original | 70/30 | 7.5 | 240 | 190 |
| | fraction>44μ | 70/30 | 0 | 175 | 60 |
| | fraction<74μ | 70/30 | 10.11 | 205 | 210 |
| | fraction<44μ | 95/ 5 | 2.90 | 175 | 100 |
| | fraction<44μ | 90/10 | 5.80 | 245 | 195 |
| | fraction<44μ | 80/20 | 11.60 | 255 | 200 |
| | fraction<44μ | 70/30 | 17.40 | 230 | 190 |
| II | original | 70/30 | 7.5 | 300 | 185 |
| | fraction>44 | 70/30 | 0 | 305 | 60 |
| | fraction<74 | 70/30 | 10.11 | 340 | 205 |
| | fraction<44 | 95/ 5 | 2.90 | 270 | 50 |
| | fraction<44 | 90/10 | 5.80 | 265 | 160 |
| | fraction<44 | 80/20 | 11.60 | 240 | 200 |
| | fraction<44 | 70/30 | 17.40 | 340 | 200 |

EXAMPLE V

The effect of the mixing water was also examined for blast-furnace slag types I and II together with quartz powder (original) in the ratio of 70/30. The ratio by weight of mixing water to mixture was 0.4.

The compressive strength (in kg./sq. cm. after 3 days at 150° C.) was found to alter only slightly whether distilled water, dune water, or sea water was now used. With the use of sea water the setting time (in minutes at 150° C.) is somewhat reduced, although not to an inadmissible extent. See Table V.

Table V

| Type of blast-furnace slag | Mixing water | Setting time | Compressive strength |
|---|---|---|---|
| I | distilled water | 240 | 190 |
| | dune water | 240 | 250 |
| | sea water | 130 | 250 |
| II | distilled water | 300 | 185 |
| | dune water | 320 | 215 |
| | sea water | 155 | 245 |

EXAMPLE VI

By adding trass (a finely ground type of tuff) to two specific types (VIII and IX) of finely ground blast-furnace slags a mixture could be obtained which amply satisfied all the requirements of a deep-drilling cement for cementing at very great depths (at temperatures of 150° C.); the finely ground blast-furnace slags alone were found very suitable for use at fairly great depths (at temperatures of 90° C.).

The results for very great depths are shown in Table VI. The value of the ratio by weight of water to mixture was 0.4.

Table VI

| Blast-furnace slags | Ratio of slags to trass | Setting time in minutes at 150° C. | Compressive strength in kg./sq. cm. after 3 days at 150° C. |
|---|---|---|---|
| VIII | 100/0 | 50 | 30 |
| | 90/10 | >450 | 140 |
| | 80/20 | >450 | 220 |
| | 70/30 | >450 | 175 |
| IX | 100/0 | 50 | 150 |
| | 90/10 | >450 | 120 |
| | 80/20 | >450 | 115 |
| | 70/30 | >450 | 75 |

It has been found that, in general, the setting of blast furnace slags with water is significantly retarded if the pH of the medium is kept low. This may be done by adding acid-reacting reagents such as acids, and/or acid-reacting salts.

Thus, by adding 1.8% by weight of HCl to the mixing water the setting time of a mixture of a given sample of blast furnace slags and water (ratio by weight of water/slags=0.40), measured at 150° C. by the Vicat method, was increased from 74 minutes to more than 300 minutes. The use of acids for this purpose, however, causes practical difficulties such as corrosion.

Good results with regard to the setting time without the corrosion problems were obtained with acid-reacting salts, such as $Al_2(SO_4)_3$, $ZnSO_4$; $NH_4Cl$ and $(NH_4)_2SO_4$ salts.

Table VII

Setting time in minutes at 150° C. of samples of blast furnace slags mixed with water, to which were added solutions of a number of acid-reacting salts in varying concentrations:

SAMPLE I

| Percent by weight of salt conc. in mixing water | $Al_2(SO_4)_3$ | $ZnSO_4$ | $NH_4Cl$ | $(NH_4)_2SO_4$ |
|---|---|---|---|---|
| 0 | 105 | 105 | 105 | 105 |
| 0.125 | 120 | | | |
| 0.25 | 150 | | | |
| 0.375 | 202 | | | |
| 0.5 | 303 | 98 | 133 | 100 |
| 0.7 | | 222 | | |
| 1.0 | | 323 | 261 | 186 |
| 1.25 | | | 382 | 243 |
| 1.5 | | | | |

SAMPLE II

| Percent by weight of salt conc. in mixing water | $Al_2(SO_4)_3$ | $ZnSO_4$ | $NH_4Cl$ | $(NH_4)_2SO_4$ |
|---|---|---|---|---|
| 0 | 132 | 132 | 132 | 132 |
| 0.125 | | | | |
| 0.25 | | | | |
| 0.375 | | | | |
| 0.5 | 144 | 100 | 177 | 157 |
| 0.7 | | | | |
| 1.0 | 163 | 130 | 187 | 205 |
| 1.25 | | | | |
| 1.5 | 205 | 190 | 190 | 253 |

From the results obtained it was also found that by adding acid-reacting salts to the mixing water the pressure resistance of blast furnace slags mixed with water is in some cases reduced slightly, but certainly not to any very great extent.

Table VIII

Compressive strength in kgs. per sq. cm. after 3 days' hardening of samples of blast furnace slags at 150° C, mixed with water, to which were added solutions of a number of acid-reacting salts.

SAMPLE I

| Salt used | Percent by weight of salt concentration | Compressive strength |
|---|---|---|
| Blank | | 210 |
| Al₂(SO₄)₃ | 1.5 | 138 |
| ZnSO₄ | 1.5 | 50 |
| NH₄Cl | 1.5 | 150 |
| (NH₄)₂SO₄ | 1.5 | |

SAMPLE II

| Salt used | Percent by weight of salt concentration | Compressive strength |
|---|---|---|
| Blank | | 181 |
| Al₂(SO₄)₃ | 0.5 | 195 |
| ZnSO₄ | 1.0 | 202 |
| NH₄Cl | 1.0 | 171 |
| (NH₄)₂SO₄ | 1.0 | 181 |

The tests were carried out with two samples of blast furnace slags, mixed with water, to which were added varying amounts (0.125–1.5% by weight) of the said salts, the ratio by weight of water to slags being 0.40.

The setting time in minutes at 150° C. and the compressive strength in kilos per sq. cm. at the same temperature after 3 days' hardening were measured.

In the foregoing description of the invention, the slags are often spoken of as finely-divided undercooled basic blast furnace slags. The term undercooled refers to the fact that the slags are or are similiar to slags that occur in molten form in the ordinary production of pig iron in the blast furnace with the use of coke and subsequently, after rapid quenching, remains largely or completely glassy. Such slags are usually basic.

We claim as our invention:

1. A method of cementing a well borehole at a depth where the formation temperature is at least about 90° C., said method comprising pumping into said borehole a mixture comprising water and a predominant quantity of a finely-divided blast-furnace slag substantially free of activators, said mixture being devoid of setting properties at atmospheric temperatures, and subjecting said mixture to said temperature of the formation traversed by the borehole to effect a retarded setting action in said mixture.

2. A method of cementing a well borehole at a depth where the formation temperature is at least about 90° C., said method comprising pumping into said borehole a mixture comprising a predominant quantity of a finely-divided blast-furnace slag substantially free of activators, water, and a quantity of a finely-divided siliceous material in the range of from 20 to 70 percent by weight of the slag, said mixture being devoid of setting properties at atmospheric temperatures, and subjecting said mixture to said temperature of the formation traversed by the borehole to effect a retarded setting action in said mixture.

3. The method of claim 2 wherein the siliceous material is quartz powder.

4. The method of claim 2 wherein the siliceous material is a pozzuolana.

5. A method of cementing a well borehole at a depth where the formation temperature is at least about 90° C., said method comprising pumping into said borehole a mixture comprising a predominant quantity of a finely-divided blast-furnace slag substantially free of activators, water, and from 0.1 to 2.0 percent by weight of an acid-reacting salt, said mixture being devoid of setting properties at atmospheric temperatures, and subjecting said mixture to said temperature of the formation traversed by the borehole to effect a retarded setting action in said mixture.

6. A method of cementing a well borehole which comprises pumping into said borehole a mixture comprising water in a predominant quantity of a finely-divided blast furnace slag substantially free of activators, said mixture being devoid of setting properties at atmospheric temperatures, and subjecting said mixture to a temperature of at least 90° C. to effect a retarded setting action in said mixture.

References Cited in the file of this patent
UNITED STATES PATENTS

| 294,080 | Roth | Feb. 26, 1884 |
| 1,452,463 | Huber | Apr. 17, 1923 |
| 2,116,469 | Karwat | May 3, 1938 |
| 2,379,516 | Garrison | July 3, 1945 |